United States Patent
Chung et al.

(10) Patent No.: US 9,203,124 B2
(45) Date of Patent: Dec. 1, 2015

(54) BATTERY PACK PROVIDING IMPROVED DISTRIBUTION UNIFORMITY OF COOLANT

(75) Inventors: Chae Ho Chung, Daejeon (KR); Ye Hoon Im, Daejeon (KR); WonChan Park, Daejeon (KR); DalMo Kang, Daejeon (KR); YongSeok Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 236 days.

(21) Appl. No.: 13/878,522

(22) PCT Filed: Nov. 2, 2011

(86) PCT No.: PCT/KR2011/008269
§ 371 (c)(1),
(2), (4) Date: Jul. 9, 2013

(87) PCT Pub. No.: WO2012/067359
PCT Pub. Date: May 24, 2012

(65) Prior Publication Data
US 2013/0280566 A1    Oct. 24, 2013

(30) Foreign Application Priority Data
Nov. 17, 2010 (KR) .................. 10-2010-0114230

(51) Int. Cl.
| | |
|---|---|
| *H01M 10/50* | (2006.01) |
| *H01M 10/613* | (2014.01) |
| *H01M 2/10* | (2006.01) |
| *H01M 2/20* | (2006.01) |
| *H01M 10/625* | (2014.01) |
| *H01M 10/6557* | (2014.01) |

(52) U.S. Cl.
CPC ........ *H01M 10/5004* (2013.01); *H01M 2/1077* (2013.01); *H01M 2/1083* (2013.01); *H01M 2/206* (2013.01); *H01M 10/613* (2015.04); *H01M 10/625* (2015.04); *H01M 10/6557* (2015.04)

(58) Field of Classification Search
CPC ............ H01M 2/1077; H01M 2/1083; H01M 10/5059; H01M 10/5004; H01M 10/5016; H01M 2/206
See application file for complete search history.

(56) References Cited

U.S. PATENT DOCUMENTS

| | | | |
|---|---|---|---|
| 2002/0102454 A1* | 8/2002 | Zhou et al. | ...................... 429/88 |
| 2006/0090492 A1* | 5/2006 | Ahn et al. | .................... 62/259.2 |

(Continued)

FOREIGN PATENT DOCUMENTS

| | | |
|---|---|---|
| EP | 0940864 A2 | 9/1999 |
| JP | 11-185831 A | 7/1999 |

(Continued)

*Primary Examiner* — Muhammad Siddiquee
(74) *Attorney, Agent, or Firm* — Dentons US LLP

(57) ABSTRACT

Disclosed herein is a battery pack having a plurality of battery cells or unit modules ('unit cells') electrically connected to each other, wherein the unit cells are arranged in a width direction (traverse direction) of the battery pack in an upright fashion in a state in which the unit cells are spaced apart from each other to form coolant flow channels, thereby constituting a battery module layer, and two or more battery module layers are mounted in a pack case such that the battery module layers are stacked in a height direction (vertical direction) of the battery pack, and wherein the battery pack includes a coolant introduction part, through which a coolant is introduced into the two or more battery module layers to simultaneously cool some or all of the unit cells in the two or more battery module layers, and a coolant discharge part, through which the coolant, having passed the unit cells, is discharged.

8 Claims, 9 Drawing Sheets

(56) References Cited

U.S. PATENT DOCUMENTS

| | | | |
|---|---|---|---|
| 2007/0292752 A1* | 12/2007 | Tsuchiya | 429/120 |
| 2009/0191452 A1 | 7/2009 | Anantharaman et al. | |
| 2011/0076540 A1* | 3/2011 | Ronning et al. | 429/120 |

FOREIGN PATENT DOCUMENTS

| | | |
|---|---|---|
| JP | 2002313440 A | 10/2002 |
| JP | 2007-042637 A | 2/2007 |
| JP | 2007-532255 A | 5/2008 |
| JP | 2008117708 A | 5/2008 |
| JP | 2008-269985 A | 11/2008 |
| JP | 20094319 A | 1/2009 |
| JP | 2009-218067 A | 9/2009 |
| JP | 2010-198971 A | 9/2010 |
| KR | 10-1998-0025149 | 8/2002 |
| KR | 10-2006-0036694 | 5/2006 |
| KR | 10-2006-0037630 | 5/2006 |
| KR | 10-0648705 | 11/2006 |
| WO | 2006/080679 A1 | 8/2006 |

* cited by examiner

US 9,203,124 B2

BATTERY PACK PROVIDING IMPROVED DISTRIBUTION UNIFORMITY OF COOLANT

This application is a National Stage Entry of International Application No. PCT/KR2011/008269, filed Nov. 2, 2011, and claims the benefit of Korean Patent Application No. 10-2010-0114230, filed on Nov. 17, 2010, all of which are hereby incorporated by reference in their entirety for all purposes as if fully set forth herein.

TECHNICAL FIELD

The present invention relates to a battery pack providing improved distribution uniformity of a coolant, and, more particularly, to a battery pack having a plurality of battery cells or unit cells, wherein the unit cells are arranged in a width direction of the battery pack in an upright fashion in a state in which the unit cells are spaced apart from each other to form coolant flow channels, thereby constituting a battery module layer, and two or more battery module layers are mounted in a pack case such that the battery module layers are stacked in a height direction of the battery pack, and wherein the battery pack includes a coolant introduction part, through which a coolant is introduced into the two or more battery module layers to simultaneously cool some or all of the unit cells in the two or more battery module layers, and a coolant discharge part, through which the coolant, having passed the unit cells, is discharged.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the middle or large-sized battery module to provide power and capacity required by a predetermined apparatus or device, it is necessary for the middle or large-sized battery module to be configured to have a structure in which a plurality of battery cells is electrically connected in series or in series and parallel to each other, and the battery cells are stable against external force.

Also, the battery cells constituting the middle or large-sized battery module are secondary batteries which can be charged and discharged. Consequently, a large amount of heat is generated from the high-power, large-capacity secondary batteries during the charge and discharge of the batteries. If the heat, generated from the unit cells during the charge and discharge of the unit cells, is not effectively removed, the heat accumulates in the respective unit cells with the result that the deterioration of the unit cells is accelerated. According to circumstances, the unit cells may catch fire or explode. For this reason, a cooling system is needed in a battery pack for vehicles, which is a high-power, large-capacity battery, to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the non-uniformity of the performance is the non-uniformity of cooling between the battery cells. For this reason, it is required to provide a structure to secure the uniformity of cooling during the flow of a coolant.

As shown in FIG. 1, a conventional middle or large-sized battery pack 20 is configured to have a structure in which unit cells are arranged in a width direction of the battery pack 20 in an upright fashion to constitute a battery module layer 10, and two or more battery module layers 10 are mounted in a pack case 15 such that the battery module layers 10 are stacked in a height direction of the battery pack 20.

In this structure, a coolant, introduced through a coolant introduction part 11 formed at the top of the pack case, sequentially passes through flow channels defined between the unit cells arranged in the vertical direction to cool the unit cells, and is then discharged out of the pack case through a coolant discharge part formed at the bottom of the pack case.

In this structure, however, temperature deviation between the battery module layers is generated, and the coolant flow channel is increased with the result that pressure difference between the unit cells is generated, whereby it is difficult to uniformly cool the battery cells.

Consequently, there is a high necessity for a technology to fundamentally solve the above-mentioned problems.

DISCLOSURE

Technical Problem

Therefore, the present invention has been made to solve the above problems and other technical problems that have yet to be resolved.

It is an object of the present invention to provide a battery pack that is capable of uniformly supplying a coolant to effectively remove heat generated from unit cells, minimizing pressure difference between the unit cells to restrain the lowering in performance of the unit cells, thereby improving cooling efficiency of the battery pack.

It is another object of the present invention to provide a battery pack wherein a coolant flow channel of the battery pack is easily changed based on the structure of a device, to which the battery pack is applied, thereby achieving flexible design of the battery pack.

Technical Solution

In accordance with one aspect of the present invention, the above and other objects can be accomplished by the provision of a battery pack having a plurality of battery cells or unit modules ('unit cells') electrically connected to each other, wherein the unit cells are arranged in a width direction (traverse direction) of the battery pack in an upright fashion in a state in which the unit cells are spaced apart from each other to form coolant flow channels, thereby constituting a battery module layer, and two or more battery module layers are mounted in a pack case such that the battery module layers are stacked in a height direction (vertical direction) of the battery pack, and wherein the battery pack includes a coolant introduction part, through which a coolant is introduced into the two or more battery module layers to simultaneously cool some or all of the unit cells in the two or more battery module layers, and a coolant discharge part, through which the coolant, having passed the unit cells, is discharged.

That is, the battery pack according to the present invention includes the coolant introduction part of a novel structure, through which the coolant is simultaneously introduced into the unit cells included in the battery module layers stacked in the vertical direction, thereby effectively removing heat from the unit cells and greatly reducing temperature deviation between the unit cells of the battery module layers.

In the battery pack according to the present invention, the battery module layers may be spaced apart from each other to prevent the flow of the coolant between the battery module layers. Consequently, it is possible to independently cool the battery module layers and to securely achieve the division between the introduced coolant and the discharged coolant, thereby further improving cooling efficiency. The above structure to prevent the flow of the coolant between the battery module layers may be realized by forming coolant flow channels only at the battery module layers.

In the battery pack according to the present invention, the coolant introduction part, through which the coolant is simultaneously introduced into the battery module layers, and the coolant discharge part may be configured to have various structures. Some preferred examples thereof will hereinafter be described.

As a first example, the coolant introduction part may be configured to have a structure in which the coolant is introduced into all of the battery module layers and all of the unit cells of each of the battery module layers.

In a concrete example of this case, the coolant discharge part, through which the coolant, having passed the battery module layers, is discharged, may be formed at the side of the pack case opposite to the coolant introduction part, and a flow direction of the coolant in the coolant discharge part may be opposite to a flow direction of the coolant in the coolant introduction part. In all of the unit cells of each of the battery module layers, therefore, the coolant flows in one direction but is not circulated.

In this structure, the coolant introduction part may be configured to have a structure in which the sectional width of the coolant introduction part is decreased in proportion to the distance from a coolant inlet duct.

The expression 'the sectional width is decreased' means that the coolant introduction part is inclined to the end of the pack case opposite to the coolant inlet duct. When the coolant, introduced through the coolant inlet duct, flows along the coolant introduction part, the flow sectional area of the coolant is gradually increased by the sectional width of the coolant introduction part decreased in proportion to the distance from the coolant inlet duct as defined above. As a result, the flow speed of the coolant is gradually increased but the flow rate of the coolant is decreased. Consequently, the coolant is uniformly introduced into the respective battery module layers irrespective of the distance from the coolant inlet duct.

That is, in a case in which the sectional width of the coolant introduction part is decreased, temperature deviation between the unit cells is reduced, thereby further improving the performance of the battery pack.

As a second example, the coolant introduction part and/or the coolant discharge part may be divided into two or more branches in the vertical direction of the battery pack.

In a concrete example of this case, the coolant introduction part may include a first branch introduction part, through which the coolant is simultaneously introduced into all unit cells (a) of at least one battery module layer (A) and some unit cells (b1) of the other battery module layer(s) (B) excluding the at least one battery module layer (A), and a second branch introduction part, through which the coolant is simultaneously introduced into the other unit cells (b2) of the other battery module layer(s) (B). That is, the branch introduction parts are formed with respect to the at least one battery module layer (A) and the other battery module layer(s) (B) to cool the unit cells, thereby further improving a uniform coolant distribution effect.

The at least one battery module layer (A) and the other battery module layer(s) (B) each may include one or more battery module layers. This structure is more preferable for battery pack including a plurality of battery module layers.

In the above structure, the coolant discharge part, through which the coolant, having been introduced through the first branch introduction part and the second branch introduction part and having passed the unit cells, is collected and then discharged, may be formed at the side of the pack case opposite to the coolant introduction part.

In another concrete example, a flow channel change part, in which the coolant, having been introduced through the first branch introduction part and the second branch introduction part and having passed unit cells, is collected, may be located at the side of the pack case opposite to the coolant introduction part, the coolant discharge part may be located between the first branch introduction part and the second branch introduction part, and the coolant from the flow channel change part may flow through a space defined between the at least one battery module layer (A) and the other battery module layer(s) (B) and then discharged through the coolant discharge part. That is, the coolant introduction part and the coolant discharge part may be located at the same side of the battery pack such that the coolant flows from the flow channel change part to the coolant discharge part through the space between the battery module layers. In this structure, the positions of the coolant introduction part and the coolant discharge part may be changed based on the structure of a device, to which the battery pack is applied, thereby achieving flexible design of the battery pack.

In the above structure, the coolant introduction part may include a first branch introduction part, through which the coolant is introduced into some unit cells (a1) of the two or more battery module layers, and a second branch introduction part, through which the coolant is introduced into some unit cells (a2) of the battery module layers, the coolant discharge part may be located between the first branch introduction part and the second branch introduction part such that the coolant having passed the other unit cells (a3) of the battery module layers is discharged through the coolant discharge part, and a flow channel change part having a coolant flow channel, through which a coolant, having been introduced through the first branch introduction part and the second branch introduction part and having passed the unit cells (a1, a2), flows to the coolant discharge part via the unit cells (a3), may be located at the side of the pack case opposite to the coolant introduction part.

In this case, a partition wall, by which the coolant from the first branch introduction part and the coolant from the second branch introduction part flow to the unit cells (a3) in a non-mixed state, may be formed in the flow channel change part.

In another example, the branch introduction part of one of the battery module layers adjacent to a coolant inlet duct may have a coolant flow channel of a vertical sectional area greater than that of the branch introduction part of the other battery module layer(s).

That is, the vertical sectional area of the branch introduction part may be changed depending upon the flow speed and flow rate of the coolant. In the same manner, the coolant discharge part of one of the battery module layers adjacent to a coolant inlet duct may have a coolant flow channel of a vertical sectional area greater than that of the coolant discharge part of the other battery module layer(s), thereby uniformalizing the flow rate of the coolant introduced into the unit cells of the respective battery module layers.

According to circumstances, the coolant introduction part may include a branch introduction part, through which the coolant is introduced into some unit cells (a1) of the two or more battery module layers, a first branch discharge part, through which the coolant passes some unit cells (a2) of the battery module layers, and a second branch discharge part, through which the coolant passes the other unit cells (a3) of the battery module layers, may be located at opposite sides of the branch introduction part, and a flow channel change part having a coolant flow channel, through which the coolant, having been introduced through the branch introduction part and having passed the unit cells (a1), flows to the first branch discharge part and the second branch discharge part via the unit cells (a2, a3), may be located at a side of the pack case opposite to the coolant introduction part.

In the above structure, a partition wall, by which the coolant from the coolant introduction part is divided such that the coolant flows to the unit cells (a2) and the unit cells (a3), may be formed in the flow channel change part.

In this structure, the positions of the coolant introduction part and the coolant discharge part may also be changed based on the structure of a device, to which the battery pack is applied, thereby achieving flexible design of the battery pack.

Also, as previously described, the branch introduction part of one of the battery module layers adjacent to a coolant inlet duct may have a coolant flow channel of a vertical sectional area greater than that of the branch introduction part of the other battery module layer(s), and the coolant discharge part of one of the battery module layers adjacent to a coolant inlet duct may have a coolant flow channel of a vertical sectional area greater than that of the coolant discharge part of the other battery module layer(s).

Meanwhile, the coolant introduction part may be formed in a space defined between a front of the pack case and fronts of the battery module layers, and the front of the pack case may include two or more continuous inclines.

Specifically, the distance between the front of the pack case and the fronts of the battery module layers may be gradually decreased from the coolant introduction part to the end of the pack case opposite to the coolant introduction part.

That is, the coolant, introduced through the coolant introduction part, is distributed into the respective battery module layers while passing the continuous inclines and reached to the end of the pack case opposite to the coolant inlet duct in a state in which the flow speed of the coolant is not changed. Consequently, it is possible to uniformly cool the battery module layers adjacent to the coolant introduction part as well as the battery module layers distant from the coolant introduction part.

In accordance with another aspect of the present invention, there is provided an electric vehicle, hybrid electric vehicle, plug-in hybrid electric vehicle, or power storage device using the battery pack with the above-stated construction as a power source.

Particularly in case of an electric vehicle, hybrid electric vehicle, or plug-in hybrid electric vehicle using the battery pack as a power source, the battery pack may be installed in a trunk of the vehicle.

The electric vehicle, the hybrid electric vehicle, the plug-in hybrid electric vehicle, or the power storage device using the battery pack as the power source thereof are well known in the art to which the present invention pertains, and therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
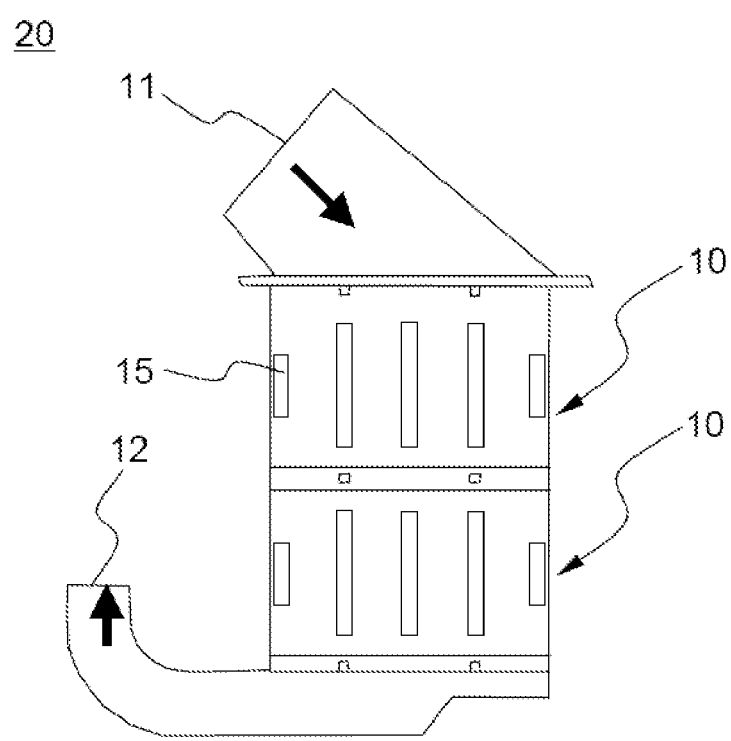
FIG. 1 is a side view typically showing a conventional middle or large-sized battery pack.
Figure 2:
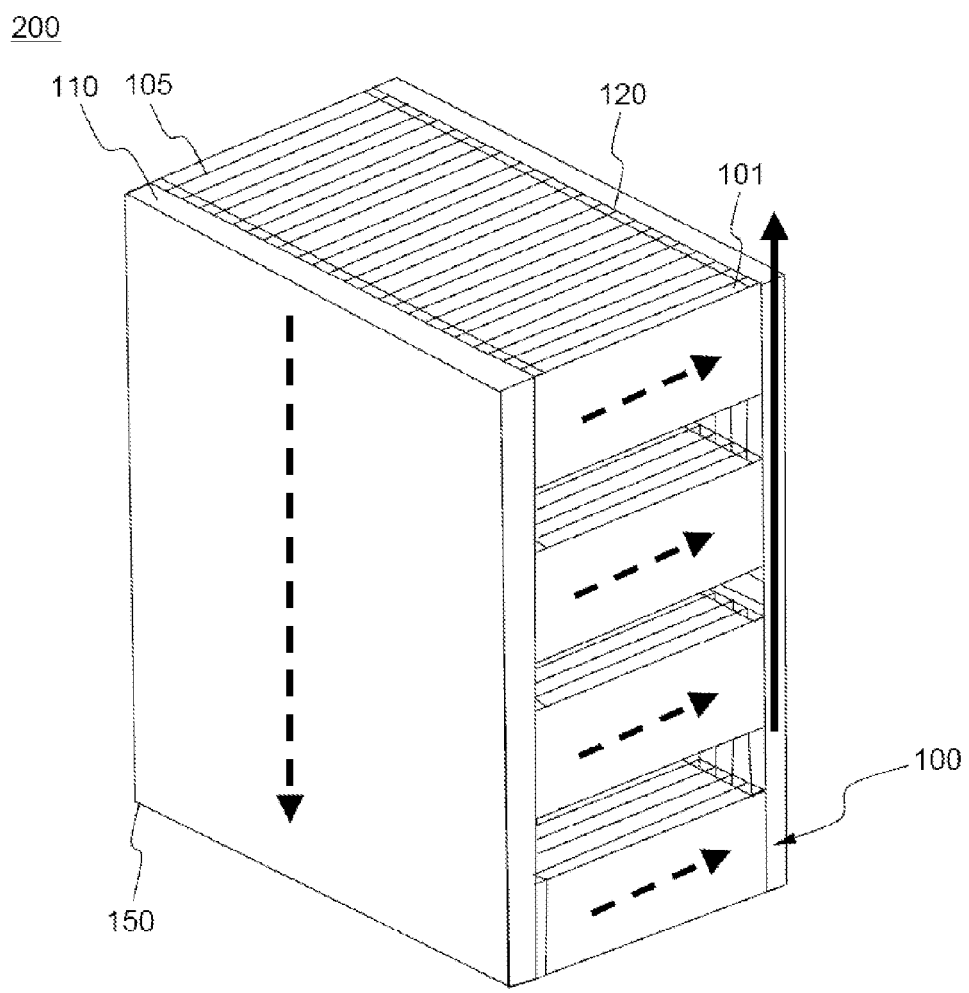
FIGS. 2 and 3 are views showing embodiments of a battery pack according to the present invention.

FIG. 2 is a perspective view typically showing an exemplary battery pack according to the present invention.

Referring to FIG. 2, a battery pack 200 is configured to have a structure in which a plurality of unit cells 101 is uprightly arranged in the lateral direction such that the unit cells 101 are spaced apart from each other to form coolant flow channels 105 therebetween, thereby constituting a battery module layer 100, and four battery module layers 100 are mounted in a pack case 150 such that the battery module layers 100 are stacked in the height direction of the battery pack 200. The battery module layers 100 are spaced apart from each other to prevent the flow of a coolant between the battery module layers 100.

A coolant introduction part 110 is configured to have a structure in which a coolant is introduced into all of the battery module layers 100 and all of the unit cells 101 of each of the battery module layers 100. A coolant discharge part 120, through which the coolant, having passed the battery module layers 100, is discharged, is formed at the side of the pack case 150 opposite to the coolant introduction part 110. A flow direction (indicated by a solid line arrow) of the coolant in the coolant discharge part 120 is opposite to a flow direction (indicated by a dotted line arrow) of the coolant in the coolant introduction part 110.

Figure 3:
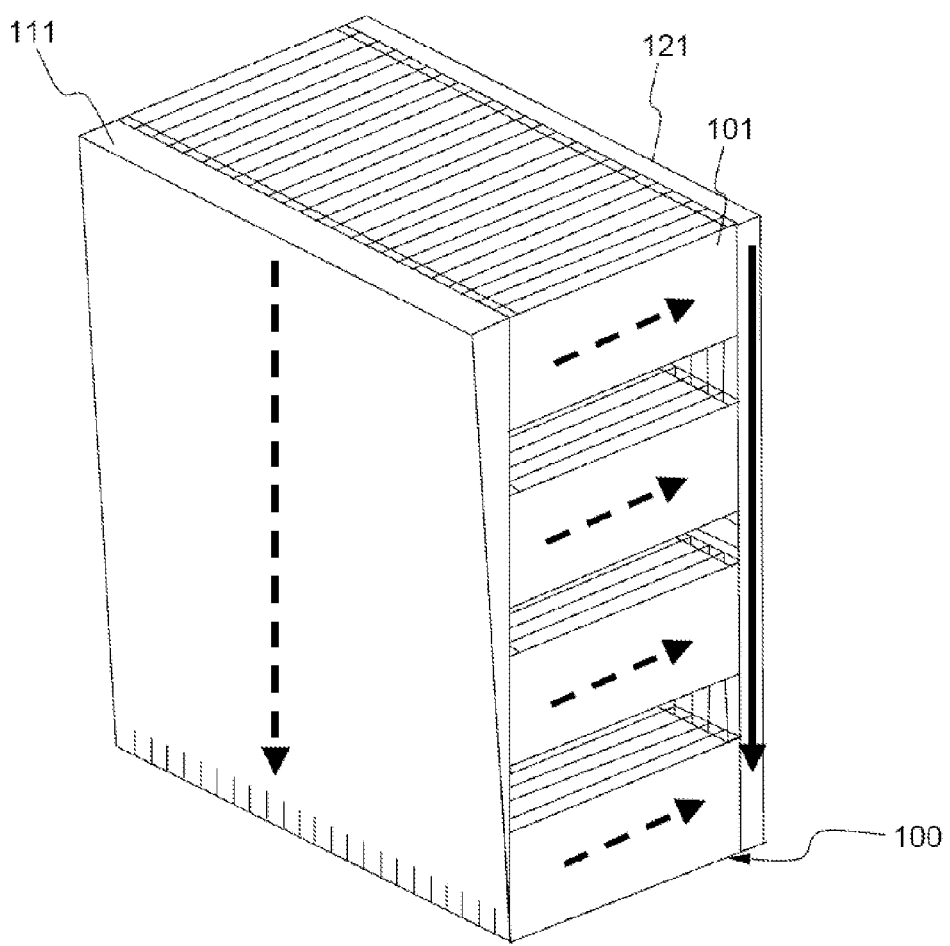

FIG. 3 is a perspective view typically showing another exemplary battery pack according to the present invention.

Referring to FIG. 3 together with FIG. 2, the battery pack of FIG. 3 is identical to the battery pack of FIG. 2 except that a coolant introduction part 111 of a battery pack 201 is configured to have a structure in which the sectional width of the coolant introduction part 111 is decreased in proportion to the distance from a coolant inlet duct (not shown), and a flow direction (indicated by a solid line arrow) in a coolant discharge part 121 is identical to a flow direction (indicated by a dotted line arrow) in the coolant introduction part 111, and therefore, a detailed description thereof will be omitted.

FIGS. 4 to 9 are perspective views typically showing embodiments of a battery pack configured such that a coolant introduction part and/or a coolant discharge part is divided into two or more branches in the vertical direction of the battery pack.

Figure 4:
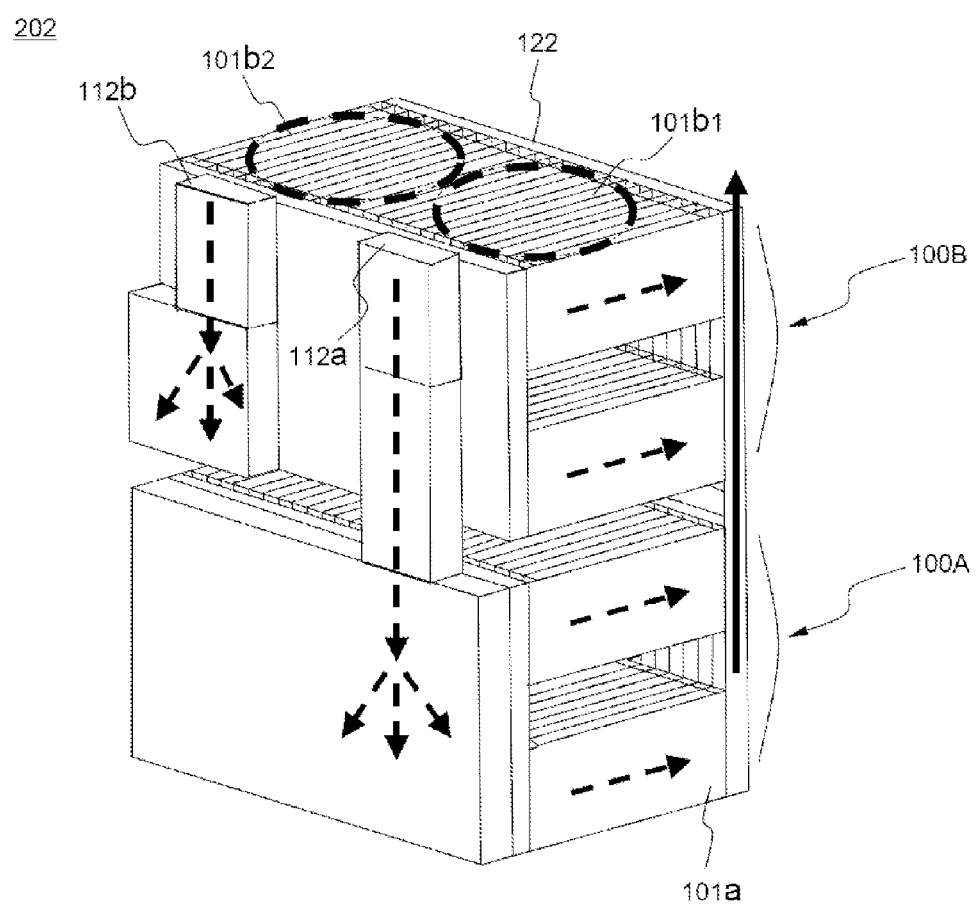
FIGS. 4 to 9 are views showing embodiments of a battery pack configured such that a coolant introduction part and/or a coolant discharge part is divided into two or more branches in the vertical direction of the battery pack.

Referring first to FIG. 4, a coolant introduction part 112 of a battery pack 202 includes a first branch introduction part 112a and a second branch introduction part 112b. A battery module layer A 100A includes two battery modules, and a battery module layer B 100B also includes two battery modules.

A coolant is simultaneously introduced into all unit cells (a) 101a of the battery module layer 100A and some unit cells 101b1 of the battery module layer 100B through the first branch introduction part 112a. The coolant is simultaneously introduced into the other unit cells 101b2 of the battery module layer 100B through the second branch introduction part 112b.

Also, a coolant discharge part 122, through which the coolant, having been introduced through the first branch introduction part 112a and the second branch introduction part 112b and having passed the unit cells, is collected and then discharged, is formed at the side of the battery pack opposite to the coolant introduction part 112.

Figure 5:
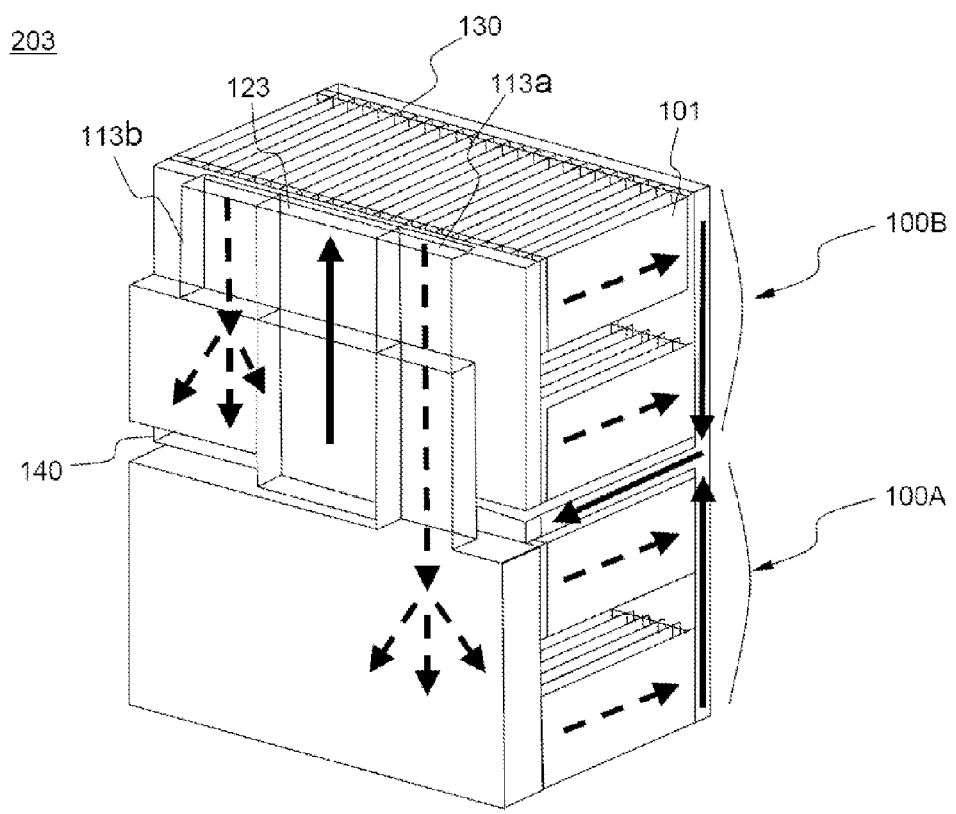

Referring to FIG. 5 together with FIG. 4, a flow channel change part 130, in which a coolant, having been introduced through a first branch introduction part 113a and a second branch introduction part 113b and having passed unit cells 101, is collected is located at the side of a battery pack 203 opposite to a coolant introduction part, and a coolant discharge part 123 is located between the first branch introduction part 113a and the second branch introduction part 113b. Consequently, the coolant from the flow channel change part 130 flows through a space 140 defined between a battery module layer 100A and a battery module layer 100B and is then discharged through the coolant discharge part 123.

Figure 6:
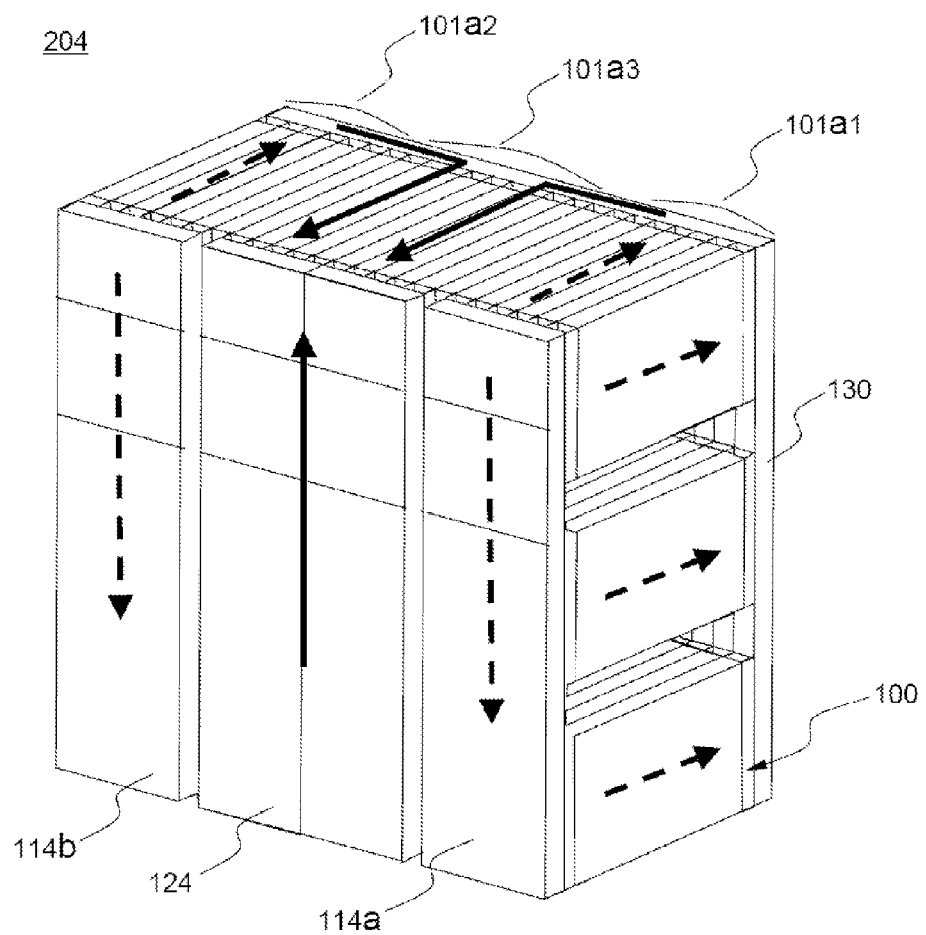

Meanwhile, referring to FIG. 6, a coolant introduction part of a battery pack 204 includes a first branch introduction part 114a, through which a coolant is introduced into some unit cells 101a1 of three battery module layers 100 and a second branch introduction part 114b, through which a coolant is introduced into some unit cells 101a2 of the battery module layers 100. A coolant discharge part 124 is located between the first branch introduction part 114a and the second branch introduction part 114b such that a coolant having passed the other unit cells 101a3 of the battery module layers 100 is discharged through the coolant discharge part 124.

Also, a flow channel change part 130 having a coolant flow channel, through which a coolant, having been introduced through the first branch introduction part 114a and the second branch introduction part 114b and having passed the unit cells 101a1 and 101a2, flows to the coolant discharge part 124 via the unit cells 101a3, is located at the side of the battery pack 204 opposite to the coolant introduction part.

In the flow channel change part 130 is formed a partition wall (not shown), by which the coolant from the first branch introduction part 114a and the coolant from the second branch introduction part 114b flow to the unit cells 101a3 in a non-mixed state.

Figure 7:
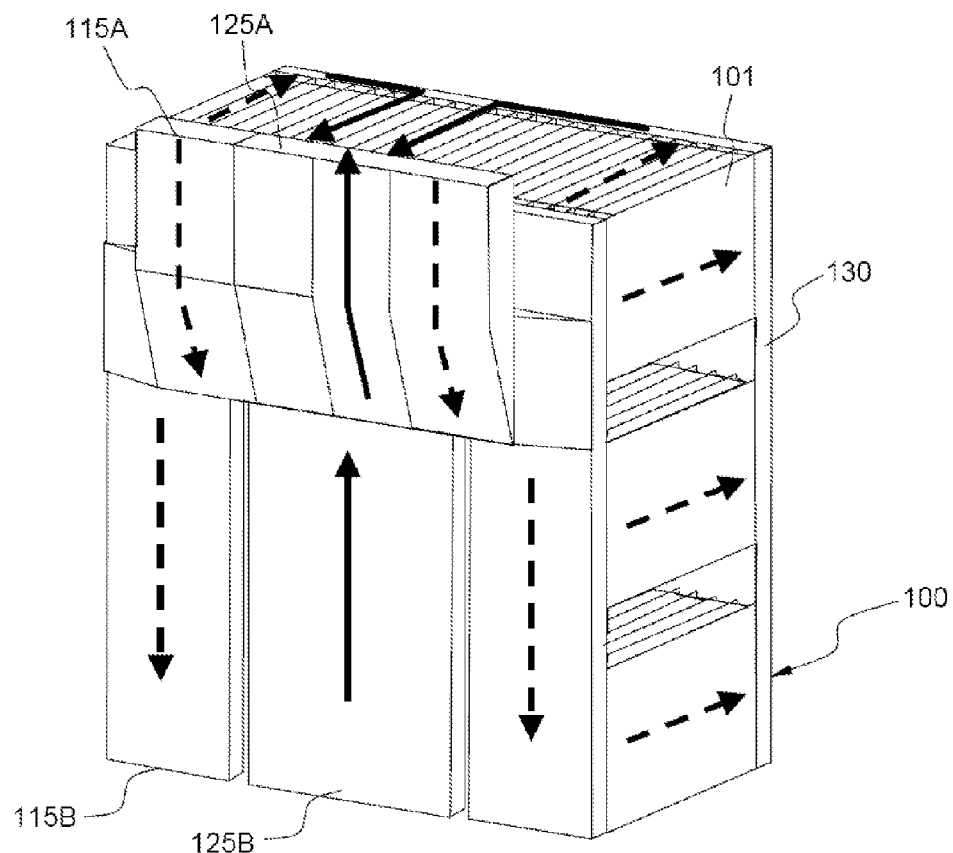

Also, referring to FIG. 7 together with FIG. 6, a battery pack of FIG. 7 is identical to the battery pack of FIG. 6 except that branch introduction parts 115A of one battery module layer 100 of the battery pack 205 adjacent to a coolant inlet duct (not shown) have coolant flow channels of a vertical sectional area greater than that of branch introduction parts 115B of the other battery module layers, and a coolant discharge part 125A of the battery module layer adjacent to the coolant inlet duct has a coolant flow channel of a vertical sectional area greater than that of a coolant discharge part 125B of the other battery module layers, and therefore, a detailed description thereof will be omitted. In this structure, the coolant inlet duct is located above the branch introduction parts 115A since the coolant inlet duct is provided to supply a coolant into coolant introduction part.

Figure 8:
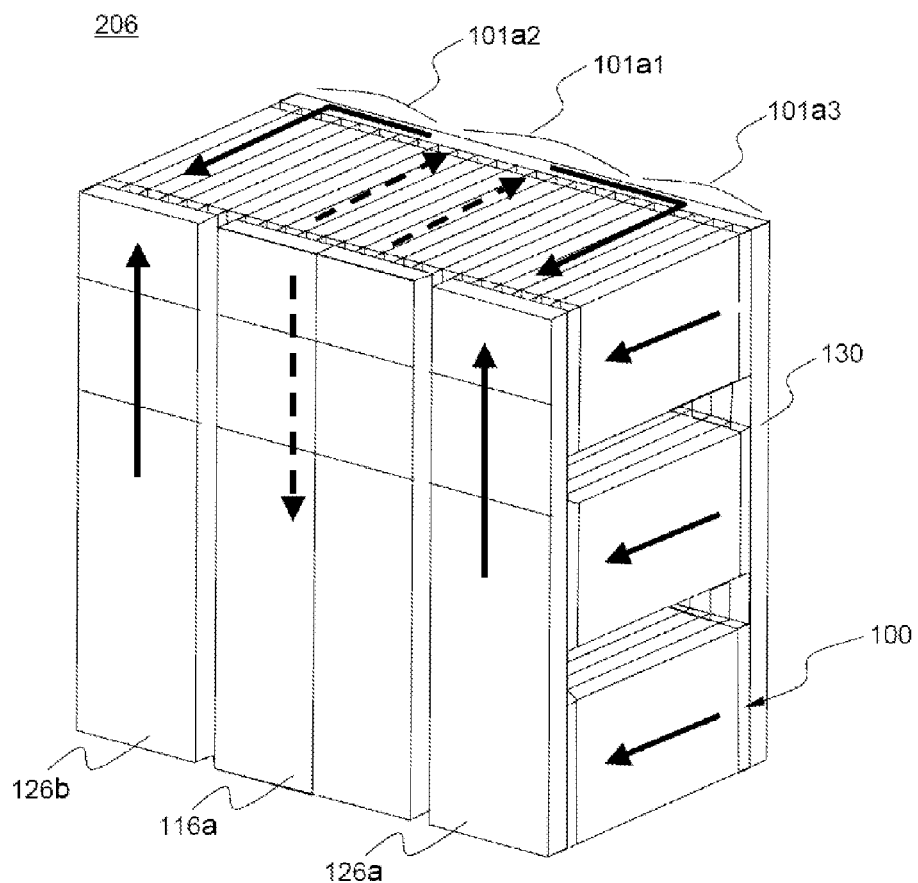

Referring to FIG. 8, a coolant introduction part of a battery pack 206 includes a branch introduction part 116a, through which a coolant is introduced into some unit cells 101a1 of three battery module layers 100. At opposite sides of the branch introduction part 116a are located a first branch discharge part 126a, through which a coolant passes some unit cells 101a2 of the battery module layers 100, and a second branch discharge part 126b, through which a coolant passes the other unit cells 101a3 of the battery module layers 100. Also, a flow channel change part 130 having a coolant flow channel, through which the coolant, having been introduced through the branch introduction part 116a and having passed the unit cells 101a1, flows to the first branch discharge part 126a and the second branch discharge part 126b via the unit cells 101a2 and 101a3, is located at the side of the battery pack 206 opposite to the coolant introduction part.

In the flow channel change part 130 is formed a partition wall (not shown), by which the coolant from the coolant introduction part 116 is divided such that the coolant flows to the unit cells 101a2 and the unit cells 101a3.

Figure 9:
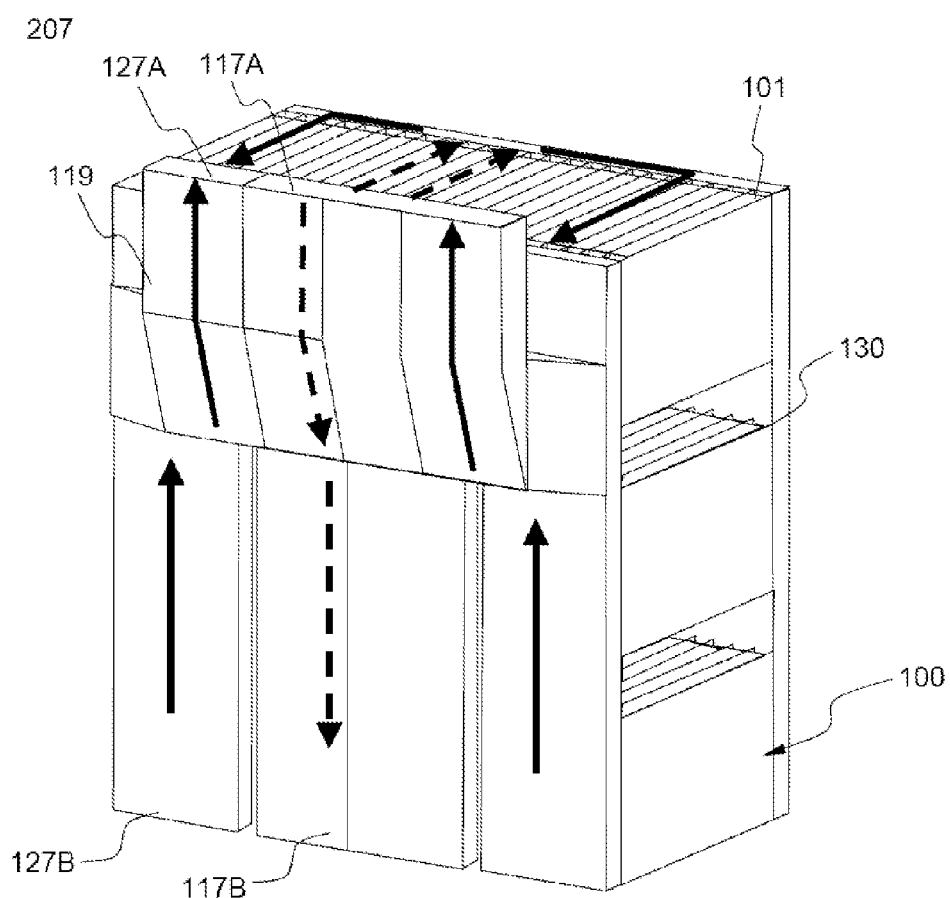

Also, referring to FIG. 9 together with FIG. 8, a battery pack of FIG. 9 is identical to the battery pack of FIG. 8 except that a branch introduction part 117A of one battery module layer 100 adjacent to a coolant inlet duct (not shown) has a coolant flow channel of a vertical sectional area greater than that of a branch introduction part 117B of the other battery module layers 100, and coolant discharge parts 127A of the battery module layer 100 adjacent to the coolant inlet duct has a coolant flow channel of a vertical sectional area greater than that of coolant discharge parts 127B of the other battery module layers, and therefore, a detailed description thereof will be omitted.

As can be seen from the above embodiments, the battery pack is configured to have a structure in which the coolant introduction part and the coolant discharge part, through which the coolant is simultaneously introduced into the battery module layers, are formed so as to correspond to the structure of a device, to which the battery pack is applied. Also, the battery pack includes the coolant introduction part, through which the coolant is simultaneously introduced into the unit cells included in the battery module layers, and the coolant discharge part, through which the coolant, having removed heat generated from the unit cells, is discharged. Consequently, it is possible to effective remove heat generated from the unit cells, thereby greatly reducing temperature deviation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention is configured to have a structure to simultaneously cool unit cells included in battery module layers, thereby uniformly supplying a coolant to the respective unit cells and minimizing temperature difference and pressure difference between the unit cells during cooling.

In addition, it is possible to easily change a coolant flow channel of the battery pack according to the present invention based on the structure of a device, to which the battery pack is applied, thereby achieving flexible design of the battery pack.

The invention claimed is:

1. A battery pack having a plurality of battery cells or unit modules ('unit cells') electrically connected to each other, wherein
the unit cells are arranged in a width direction (traverse direction) of the battery pack in an upright fashion in a state in which the unit cells are spaced apart from each other to form coolant flow channels, thereby constituting a battery module layer, and two or more battery module layers are mounted in a pack case such that the battery module layers are stacked in a height direction (vertical direction) of the battery pack, and wherein
the battery pack comprises a coolant introduction part, through which a coolant is introduced into the two or more battery module layers to simultaneously cool some or all of the unit cells in the two or more battery module layers, and a coolant discharge part, through which the coolant, having passed the unit cells, is discharged;
wherein the coolant introduction part and/or the coolant discharge part is divided into two or more branches in the vertical direction of the battery pack, and
wherein the coolant introduction part comprises a first branch introduction part, through which the coolant is simultaneously introduced into all unit cells (a) of at least one battery module layer (A) and some unit cells (b1) of the other battery module layer(s) (B), and a second branch introduction part, through which the coolant is simultaneously introduced into the other unit cells (b2) of the other battery module layer(s) (B).

2. The battery pack according to claim 1, wherein the battery module layers are spaced apart from each other to prevent the flow of the coolant between the battery module layers.

3. The battery pack according to claim 1, wherein the at least one battery module layer (A) and the other battery module layer(s) (B) each comprises one or more battery module layers.

4. The battery pack according to claim 1, wherein the coolant discharge part, through which the coolant, having been introduced through the first branch introduction part and the second branch introduction part and having passed the unit cells, is collected and then discharged, is formed at a side of the pack case opposite to the coolant introduction part.

5. The battery pack according to claim 1, wherein a flow channel change part, in which the coolant, having been introduced through the first branch introduction part and the second branch introduction part and having passed unit cells, is collected, is located at a side of the pack case opposite to the coolant introduction part, the coolant discharge part is located between the first branch introduction part and the second branch introduction part, and the coolant from the flow channel change part flows through a space defined between the at least one battery module layer (A) and the other battery module layer(s) (B) and is then discharged through the coolant discharge part.

6. The battery pack according to claim 1, wherein the coolant introduction part is formed in a space defined between a front of the pack case and fronts of the battery module layers, and the front of the pack case comprises two or more continuous inclines.

7. An electric vehicle, hybrid electric vehicle, plug-in hybrid electric vehicle, or power storage device using a battery pack according to claim 1 as a power source.

8. An electric vehicle, hybrid electric vehicle, plug-in hybrid electric vehicle, or power storage device using a battery pack according to claim 1 as a power source, wherein the battery pack is installed in a trunk of the vehicle.

* * * * *